United States Patent
Hedderly et al.

[11] Patent Number: 6,152,488
[45] Date of Patent: Nov. 28, 2000

[54] STEERING COLUMN WITH VARIABLE COLLAPSE FORCE

[75] Inventors: Gregory Thomas Hedderly, White Lake; Craig Hammann Stephan, Ann Arbor; Edward Joseph Abramoski, Canton; Joseph Paul Tekelly, Troy; Leonard Murray Brown, Farmington Hills, all of Mich.

[73] Assignee: Ford Global Technologies, Inc., Dearborn, Mich.

[21] Appl. No.: 09/334,244

[22] Filed: Jun. 16, 1999

[51] Int. Cl.[7] ............................................. B62D 1/18
[52] U.S. Cl. ........................... 280/775; 280/777; 188/267; 188/267.1; 188/376; 188/377
[58] Field of Search ............................... 74/492, 493, 495, 74/496; 280/775, 777; 188/377, 376, 267, 267.1; 267/140.14

[56] References Cited

U.S. PATENT DOCUMENTS

| | | |
|---|---|---|
| 3,530,737 | 9/1970 | Higginbotham . |
| 4,019,403 | 4/1977 | Kondo et al. . |
| 4,255,986 | 3/1981 | Mukoyama . |
| 4,566,718 | 1/1986 | Kanai et al. ............................. 280/708 |
| 5,277,281 | 1/1994 | Carlson et al. . |
| 5,295,712 | 3/1994 | Omura . |
| 5,419,581 | 5/1995 | Schafer et al. . |
| 5,449,199 | 9/1995 | Heinrichs et al. ...................... 280/775 |
| 5,652,704 | 7/1997 | Catanzarite ....................... 364/424.059 |
| 5,996,745 | 12/1999 | Jones, Jr. et al. .................... 188/266.7 |

FOREIGN PATENT DOCUMENTS 24 17 543 A1  10/1975  Germany .

Primary Examiner—Michael Mar
Assistant Examiner—Devon Kramer
Attorney, Agent, or Firm—Gregory P. Brown; Roger L. May

[57] ABSTRACT

A method is provided for optimizing energy dissipation in a vehicle steering column in a high energy impact. The method includes the steps of: (a) providing a variable energy dissipation system on the vehicle steering column; (b) sensing at least one occupant condition; and (c) adjusting the variable energy dissipation system based upon the sensed occupant condition to optimize energy dissipation.

15 Claims, 1 Drawing Sheet

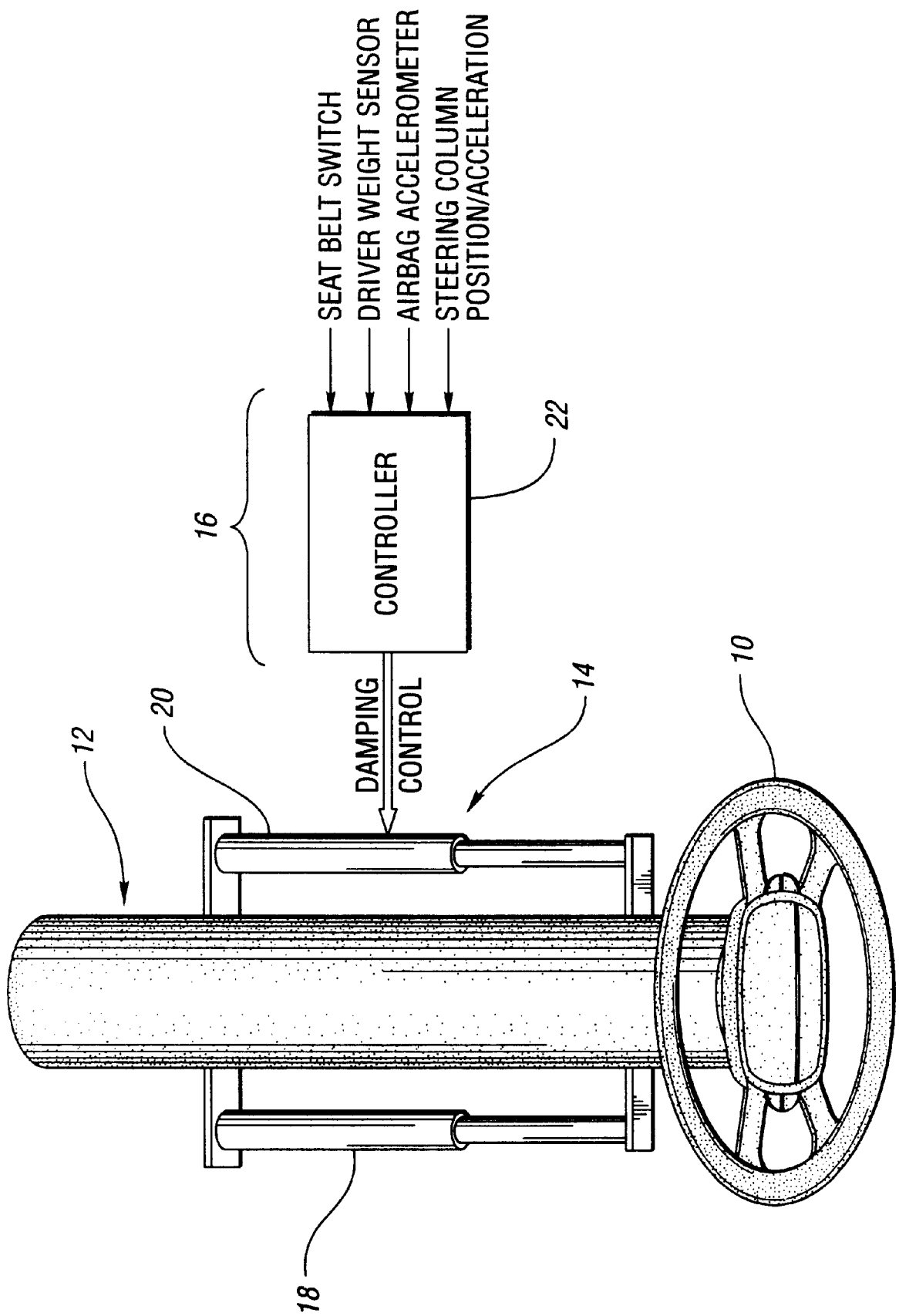

STEERING COLUMN WITH VARIABLE COLLAPSE FORCE

TECHNICAL FIELD

The present invention relates to a method of optimizing energy dissipation in a vehicle steering column by adjusting a variable damper based upon sensed occupant conditions in a high energy impact.

BACKGROUND ART

Steering columns of passenger cars are designed to collapse during a collision in order to dissipate energy of a vehicle occupant engaging the steering wheel. Typically, steering columns are provided with deformable crash features for such energy dissipation. However, the optimum force with which the column should resist collapse depends on whether the driver is belted or unbelted, as well as other occupant factors, and may vary significantly. No known prior art steering column system includes variable energy dissipation characteristics enabling adjustment for such factors.

It is, therefore, desirable to provide a steering column assembly with adjustable damping based upon these various factors, such as occupant weight, crash severity, etc., in order to optimize the energy dissipation characteristics of a collapsible steering column in a vehicle.

DISCLOSURE OF INVENTION

The present invention provides a method whereby resistance to steering column collapse is optimized during a crash based upon specific occupant conditions, such as crash severity, driver weight, driver belted or unbelted condition, etc. The invention also provides a method whereby energy dissipation in the steering column may be varied dynamically during steering column collapse.

More specifically, the present invention provides a method of optimizing energy dissipation in a vehicle steering column in a high energy impact, including: (a) providing a variable energy dissipation system on the vehicle steering column; (b) sensing at least one occupant condition; and (c) adjusting the variable energy dissipation system based upon the sensed occupant condition to optimize energy dissipation.

The variable energy dissipation system may comprise a hydraulic damper with an electronically variable orifice, or a hydraulic damper with a damping fluid having an effective viscosity which is variable by varying a magnetic field intersecting the damping fluid. Also, the sensed occupant conditions may include crash severity, whether a vehicle seat belt is buckled, the occupant weight, etc.

The adjustment of the variable energy dissipation system may comprise disengaging the hydraulic damper or dynamically adjusting the damping rate of the hydraulic damper based upon the sensed occupant conditions.

In a preferred embodiment, a capacitor is charged to a high voltage when the vehicle ignition is turned on to enable electronic variation of the variable energy dissipation system in the event power is lost in the vehicle.

Accordingly, an object of the invention is to provide a means of selectively adjusting a variable collapse force of a steering column assembly based upon various sensed occupant conditions.

The above object and other objects, features and advantages of the present invention are readily apparent from the following detailed description of the best mode for carrying out the invention when taken in connection with the accompanying drawing.

BRIEF DESCRIPTION OF DRAWING

The FIGURE shows a schematic view of a variable rate damper attached to a collapsible steering column, and including a control system for adjusting the variable rate damper.

BEST MODE FOR CARRYING OUT THE INVENTION

Referring to the FIGURE, a steering wheel 10 is attached to a collapsible steering column assembly 12. The collapsible steering column assembly 12 is provided with a variable energy dissipation system 14 and a control system 16 for adjusting the variable energy dissipation system 14 as desired in a high energy impact.

Preferably, the variable energy dissipation system 14 includes first and second hydraulic damper mechanisms 18,20 integrated therein, or supplementally attached thereto. The damping rate of the hydraulic damper mechanisms 18,20 may be adjusted by an electronic controller 22 by any of several means. The size of the damping orifice can be changed either mechanically or, for higher speed, piezoelectrically. For example, a piezoelectrically variable hydraulic damper may be obtained from Active Control eXperts, Inc. of Troy, Mich., sold under the name "K2 BIKE SmartShock." Alternatively, a fixed orifice can be used with an electrorheological or magnetorheological fluid as the damping fluid. Electrorheological materials are suspensions of micron-sized polarizable particles, while magnetorheological fluids are similar suspensions of iron-based particles. The effective viscosity of these fluids is changeable, which exhibit large rheological changes when subjected to strong electric fields. The effective viscosity of the fluid is changeable by the application of an electric or magnetic field in the vicinity of the orifice. The electric or magnetic field may be created by a voltage supply or an electromagnet.

As illustrated in the FIGURE, at least three pieces of information are available to the electronic controller 22 from sensors which may be present in the vehicle for other reasons. Depending upon implementation, any combination of these, as well as input from a variety of miscellaneous sensors, may be used. The belted condition of the driver is obtained by a seat belt sensor. The driver's mass is determined by a weight sensor in the seat, and the severity of the collapse is determined from the air bag accelerometer module, perhaps supplemented by the speedometer reading at the beginning of the crash. An example of a miscellaneous sensor that may be used is a seat track position sensor that may provide further information regarding the driver and his relationship to the steering wheel.

From this data, the controller 22 determines what the optimum damping should be. Various degrees of sophistication can be used. The simplest is no more than "on" or "off," based on whether the driver is belted or unbelted. If belted, the collapsible steering column is used alone with no supplemental damping. If unbelted, the steering column collapse force is supplemented by the damping mechanism 14. In this case, the damping mechanism 14 need not be controllable, but could simply be kept in an engaged or disengaged condition by either a mechanical latch or a bypass valve in the damper, whose position is determined on the basis of the signal from the seat belt sensor. Since this position would be determined before the crash, high speed switching would not be necessary. In fact, hydraulic damping itself would not be necessary. Alternatively, a supplemental crushable member could be used. However, to avoid the use of mechanical latches, it may still be preferable to use an electrically adjustable damper. In this case, the controller 22 could be a very simple circuit.

A step up in sophistication from this approach is to use driver mass and/or crash severity to determine intermediate levels of damping. A more sophisticated approach yet changes the damping dynamically during the crash according to a previously defined protocol determined on the basis of biomechanical considerations. An alternative method for determining the damping, one that does not rely on a measurement of driver mass, is to mount an accelerometer on a particular portion of the vehicle such as the steering wheel or the collapsible portion of the steering column; or, alternatively, to derive velocity and/or acceleration from a sensor that measures piston movement in the damper. The controller 22 then adjusts the damping of the dampers 18, 20 as necessary to limit the acceleration (which is related to the acceleration of the driver when he or she is in contact with the steering wheel through the air bag) to that which results in a predetermined occupant deceleration value.

In the latter two cases, the damping rate must be adjusted very quickly. In the case of electrorheological or magnetorheological fluids, the rate of change of effective viscosity is very rapid, being limited primarily by the buildup time of the field. Changing the field rapidly requires high power, but since the collision time is short, not much energy. A preferred method of providing this power is to charge a capacitor to a high voltage when the ignition is turned on. The energy in the capacitor is then available for creating the electric or magnetic field, or to activate a piezoelectric orifice. With an additional capacitor to power the electronics, this would assure fail-safe operation even if battery power failed.

Another feature provided by the system is the possibility of improving noise and vibration characteristics under normal driving conditions by using the dampers to damp axial and radial steering column vibrations. The latter mode might be damped by canting the dampers by a few degrees with respect to the steering column.

In the discussion so far, the controllable dampers have been used to supplement the crush resistance of the steering column itself. Normally, the steering column would be designed according to methods well known to the state of the art, to provide a mechanical crush force that in this case would be the minimum needed (e.g., low-speed crash, belted driver). The controllable damping would then provide an extra damping force when needed for an unbelted driver or severe crash. An important difference to note between mechanical crush and hydraulic damping is that the former force is more or less independent of the crash speed, while the latter increases as crash speed increases. Thus, even if the simplest control mode, the hydraulic damping provides an "automatic" adjustment for crash speed: the more severe the crash, the greater the crush resistance. Of course, if the damping is electronically adjusted, any damping profile can be chosen within the range of the dampers.

Alternatively, the mechanical crush resistance could be eliminated entirely, and the hydraulic dampers used to provide the total crush resistance. In this case, the steering column would normally be held in the fully extended position by a shear pin or some other device that would prevent the dampers from collapsing under normal use. The damping would be set to a nominal value. For a magnetorheological fluid damper, the magnetic field required to do this could be provided by a permanent magnet, with the electromagnet increasing or decreasing the nominal field as required. This has a fail-safe advantage that if all electrical power fails, the steering column collapse would revert to a nominal rate. It has a further advantage that the magnetic field need only be shifted from a nominal value, rather than generated from a zero value, so that the time and energy needed to establish the correct field is minimized.

An advantage of putting all the collapse-resistance in the dampers is derived from the fact that in a crash the steering column is usually pushed not only forward but also upward. For maximum effectiveness, the dampers could be oriented along the direction of force of the driver, rather than along the axis of the steering column.

While the best modes for carrying out the invention have been described in detail, those familiar with the art to which this invention relates will recognize various alternative designs and embodiments for practicing the invention within the scope of the appended claims.

What is claimed is:

1. A method of optimizing energy dissipation in a vehicle steering column in a high energy impact, comprising:
   providing a variable energy dissipation system on the vehicle steering column;
   sensing at least one occupant condition; and
   adjusting the variable energy dissipation system based upon said sensed occupant condition to optimize energy dissipation;
   wherein said step of providing a variable energy dissipation system comprises providing a hydraulic damper with an electronically variable orifice.

2. The method of claim 1, wherein said electronically variable orifice comprises a piezoelectrically controlled valve.

3. The method of claim 1, wherein said step of providing a variable energy dissipation system comprises providing a hydraulic damper with a damping fluid having an effective viscosity which is variable by varying a magnetic field intersecting the damping fluid.

4. The method of claim 1, wherein said step of providing a variable energy dissipation system comprises providing a hydraulic damper with a damping fluid having an effective viscosity which is variable by varying an electric field intersecting the damping fluid.

5. The method of claim 1, wherein said step of sensing at least one occupant condition comprises sensing whether a vehicle seat belt is buckled.

6. The method of claim 1, further comprising charging a capacitor to a high voltage when the vehicle ignition is turned on to enable electronic variation of the variable energy dissipation system if power is lost.

7. The method of claim 1, wherein said step of sensing at least one occupant condition comprises sensing the weight of a seat occupant.

8. The method of claim 5, wherein said step of adjusting the variable energy dissipation system comprises disengaging the variable energy dissipation system if the sensed seat belt is buckled.

9. The method of claim 1, wherein said step of sensing at least one occupant condition comprises sensing vehicle deceleration.

10. The method of claim 1, wherein said step of sensing at least one occupant condition comprises sensing vehicle speed.

11. A method of optimizing energy dissipation in a vehicle steering column assembly, including a steering column and steering wheel, in a high energy impact, comprising:

providing a hydraulic damper on the vehicle steering column for damping steering column collapse in a high energy impact, wherein the damper has a variable damping rate;

sensing vehicle occupant weight;

sensing deceleration of a particular portion of the steering column assembly;

determining an estimated driver deceleration based on the sensed occupant weight and sensed vehicle deceleration; and varying the damping rate of the damper based upon said estimated driver deceleration.

12. A method of optimizing energy dissipation in a vehicle steering column in a high energy impact, comprising:

providing a variable energy dissipation system on the vehicle steering column;

sensing whether a vehicle seat belt is buckled; and adjusting the variable energy dissipation system based upon said sensed seat belt buckled condition to optimize energy dissipation.

13. A method of optimizing energy dissipation in a vehicle steering column in a high energy impact, comprising:

providing a variable energy dissipation system on the vehicle steering column;

charging a capacitor to a high voltage when the vehicle ignition is turned on to enable electronic variation of the variable energy dissipation system if power is lost;

sensing at least one occupant condition; and adjusting the variable energy dissipation system based upon said sensed occupant condition to optimize energy dissipation.

14. A method of optimizing energy dissipation in a vehicle steering column in a high energy impact, comprising:

providing a variable energy dissipation system on the vehicle steering column;

sensing vehicle deceleration; and adjusting the variable energy dissipation system based upon said sensed vehicle deceleration to optimize energy dissipation.

15. A method of optimizing energy dissipation in a vehicle steering column in a high energy impact, comprising:

providing a variable energy dissipation system on the vehicle steering column;

sensing vehicle speed; and adjusting the variable energy dissipation system based upon said sensed vehicle speed to optimize energy dissipation.

* * * * *